(12) United States Patent
Taylor

(10) Patent No.: US 8,768,244 B2
(45) Date of Patent: Jul. 1, 2014

(54) CONTENT DELIVERY COORDINATOR APPARATUS AND METHOD

(71) Applicant: The Boeing Company, Chicago, IL (US)

(72) Inventor: Scott P. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/705,134

(22) Filed: Dec. 4, 2012

(65) Prior Publication Data

US 2013/0137365 A1    May 30, 2013

Related U.S. Application Data

(63) Continuation of application No. 10/744,836, filed on Dec. 23, 2003, now abandoned.

(51) Int. Cl.
*H04B 7/185* (2006.01)

(52) U.S. Cl.
USPC .......... 455/12.1; 455/427; 455/430; 455/431; 370/316

(58) Field of Classification Search
USPC ...................... 455/427–431, 12.1, 13.1–13.3; 370/316, 329
See application file for complete search history.

(56) References Cited

U.S. PATENT DOCUMENTS

| | | |
|---|---|---|
| 5,822,429 A | 10/1998 | Casabona et al. |
| 5,930,680 A | 7/1999 | Lusignan |
| 5,937,328 A | 8/1999 | Park et al. |
| 5,943,324 A | 8/1999 | Ramesh et al. |
| 6,075,969 A | 6/2000 | Lusignan |
| 6,091,936 A | 7/2000 | Chennakeshu et al. |

(Continued)

FOREIGN PATENT DOCUMENTS

| | | |
|---|---|---|
| EP | 1052790 A1 | 11/2000 |
| WO | WO 00/14987 A1 | 3/2000 |

OTHER PUBLICATIONS

Losquadro, G., "ABATE: Aeronautical Satellite Communications for on Multimedia Services," Proceedings of European Conference on Satellite Communications, XX, Nov. 18, 1997 (The Institution of Electrical Engineers, 1997), pp. 7/1-7/7.

(Continued)

*Primary Examiner* — Nay A Maung
*Assistant Examiner* — Angelica M Perez
(74) *Attorney, Agent, or Firm* — Baker & Hostetler LLP

(57) ABSTRACT

Apparatus and method for managing and coordinating the delivery of information content in a manner that makes efficient use of the bandwidth of satellite based transponders being used to relay the information content to the mobile platforms. The apparatus makes use of a content management coordinator system having a graphical user interface (GUI). The GUI interfaces with one or more mobile platform operators to allow each of the operators to define the criteria by which various types of information content to be supplied to the mobile platforms. The apparatus further includes a file spaced storage monitoring subsystem which allows the file storage space available on each mobile platform to be monitored, and files deleted therefrom if necessary, to ensure that newly requested information content can be stored by the mobile platform. Information content is coordinated and aggregated as needed to ensure that transponder bandwidth is used most effectively for delivering various types of information content to each mobile platform requesting the content within each coverage region being controlled by the apparatus.

17 Claims, 2 Drawing Sheets

(56) References Cited

U.S. PATENT DOCUMENTS

| | | | |
|---|---|---|---|
| 6,107,960 | A | 8/2000 | Krasner |
| 6,169,881 | B1 | 1/2001 | Astrom et al. |
| 6,272,679 | B1 | 8/2001 | Norin |
| 6,298,073 | B1 | 10/2001 | LeFever |
| 6,330,462 | B1 | 12/2001 | Chen |
| 6,392,692 | B1 | 5/2002 | Monroe |
| 6,408,180 | B1 | 6/2002 | McKenna et al. |
| 6,597,892 | B1 | 7/2003 | Caldwell et al. |
| 6,741,841 | B1 * | 5/2004 | Mitchell .................. 455/188.1 |
| 6,747,577 | B2 | 6/2004 | Chakravarty et al. |
| 6,757,712 | B1 * | 6/2004 | Bastian et al. .............. 709/206 |
| 6,785,526 | B2 | 8/2004 | McLain et al. |
| 6,810,527 | B1 * | 10/2004 | Conrad et al. ................ 725/76 |
| 6,898,432 | B1 | 5/2005 | Jiang |
| 6,968,394 | B1 * | 11/2005 | El-Rafie ..................... 709/245 |
| 7,020,708 | B2 | 3/2006 | Nelson et al. |
| 7,065,321 | B2 * | 6/2006 | Lim ............................ 455/13.2 |
| 7,133,837 | B1 | 11/2006 | Barnes, Jr. |
| 7,450,901 | B2 * | 11/2008 | Parkman .................... 455/12.1 |
| 7,587,736 | B2 * | 9/2009 | Summers et al. .............. 725/95 |
| 2002/0050944 | A1 | 5/2002 | Sheynblat et al. |
| 2002/0090946 | A1 | 7/2002 | Mielke et al. |
| 2002/0146995 | A1 * | 10/2002 | McLain et al. ............... 455/296 |
| 2002/0160773 | A1 | 10/2002 | Gresham et al. |
| 2003/0046118 | A1 | 3/2003 | O'Donnell |
| 2003/0046438 | A1 | 3/2003 | O'Donnell |
| 2003/0046701 | A1 | 3/2003 | O'Donnell |
| 2004/0008726 | A1 * | 1/2004 | Kelly et al. .................. 370/468 |

OTHER PUBLICATIONS

Publication entitled Proceedings of the 17$^{th}$ Symposium "Aircraft Integrated Monitoring systems", Sep. 21-23, 1993 in Bonn; by Helmut Hardegen.

UHF SATCOM Downlink Interference for the Mobile Platform, Military Communications Conference, 1996, pp. 22-28, E. Franke.

* cited by examiner

CONTENT DELIVERY COORDINATOR APPARATUS AND METHOD

This application is a continuation of U.S. patent application Ser. No. 10/744,836, filed Dec. 23, 2003, now abandoned.

FIELD OF THE INVENTION

Methods and apparatus for delivering information content from a ground based content provider to mobile platforms operating within a predefined coverage region, and more particularly to a content delivery coordinator system and method which allows a ground based operator of the mobile platforms to select specific types of content to be made available to the mobile platforms under various selected conditions and criteria defined by the operator.

BACKGROUND OF THE INVENTION

The demand for information content, such as access to email accounts, information available over the Internet or other wide area networks, by individuals traveling on mobile platforms is expected to rise dramatically in the following years. Presently, various forms of mobile platforms, and particularly commercial aircraft, are being outfitted with equipment enabling the aircraft to communicate, via a transponded satellite communications link, with a ground based information content provider. This system is known as the "CONNEXION BY BOEING$^{SM}$" system available from the assignee of the present application. The CONNEXION BY BOEING$^{SM}$ system allows a wide variety of information content to be supplied to mobile platforms, particularly commercial aircraft, traveling within a predefined coverage region being served by one or more satellite based transponders. A general description of this system is available in U.S. application Ser. No. 10/008,401, which is hereby incorporated by reference into the present application.

With the ability to supply a tremendous volume of information content to mobile platforms operating within a given coverage region, comes the issue of managing the supply of information content to achieve the most efficient delivery of the information content, and further in a manner which makes the most efficient use of the available transponder bandwidth. Since multiple mobile platforms operating within a given coverage region may only rarely be requesting the exact same information content (e.g., specific weather service or news information), the opportunity exists for the limited available transponder bandwidth to be used inefficiently. This is because when information content is transmitted by a satellite, it is available to all users (i.e., mobile platforms) within a given coverage region, regardless if all users within the coverage region are accessing or requesting the specific information content. For example, one user on aircraft A operating within a coverage region may request the online version of the WALL STREET JOURNAL®, whereafter this information is delivered via the satellite communications link to aircraft A. The user on aircraft A may only view this content for twenty minutes, and then user A on aircraft B may request the same content. This would necessitate using additional transponder bandwidth to deliver the same content to aircraft B. As one can see, transponder resources can end up being used quite inefficiently if the availability of information content is not managed and its delivery is not coordinated in an efficient way.

The need to coordinate and aggregate various types of information content is not nearly as significant with a static wide area network connection, such as a static Internet connection, because the Internet content recipients are geographically static and the Internet connection is continuously available, Furthermore, content available via some wide area networks such as the Internet, is presently available at a relatively low cost.

Thus, what is needed is some form of management over the information content made available to the various mobile platforms operating within a given coverage region in a manner that allows transponder bandwidth to be used much more efficiently and effectively.

SUMMARY OF THE INVENTION

The present system is directed to a content delivery coordinator system and method which manages delivery of various types of information content to a plurality of mobile platforms operating within a given coverage region, where each of the mobile platforms are in communication with the present system via a transponded satellite communications link. The present system more specifically involves a content management coordinator system and method making use of a graphical user interface (GUI) to provide a wide variety of options to an operator associated with the mobile platforms such that the operator can select and tailor the delivery of various types of information content to the mobile platforms. The operator is in communication with the graphical user interface by any suitable means, such as via a wide area network, for example the Internet connection. Through the GUI, the operator can effectively program the delivery of various types of information content to each of its associated mobile platforms. In one particular form, the operator may comprise an airline and the mobile platforms may comprise aircraft operating within a given coverage region being served by the transponded satellite. Once the operator has defined various criteria for the delivery of information content, the content management coordinator makes use of a suitable delivery mechanism for transmitting the information content to the transponded satellite, which in turn transponds the information to one or more mobile platforms.

In one preferred form the graphical user interface provides a wide variety of selections to enable the operator to define criteria that enable information content to be supplied in a much more effective and efficient fashion to the mobile platforms. Such criteria may include one or more of the following:

specific types of information content to be made available to the mobile platforms;

one or more specific time frames during which the information content is to be made available;

designating whether the delivery of specific types of information content is to be made automatically to one or more mobile platforms upon the one or more mobile platforms entering the given coverage region;

whether only a best effort is to be made to deliver one or more specific types of information content to the mobile platforms upon request;

whether priority is to be given to delivering certain types of information content to the mobile platforms; and whether certain types of information content are to be delivered automatically at predetermined intervals to the mobile platforms.

The content management coordinator system, in one preferred embodiment, further manages the file storage on one or more of the mobile platforms and deletes files as needed from a server on board the one or more mobile platforms. This ensures that adequate storage space is available on each mobile platform for the specific information content being requested by a mobile platform.

In another preferred form the content management coordinator system provides cost information to the operator that enables the operator to select certain types of information content that may be made available to the mobile platforms, upon their request, based on various costs associated with the supply of the information. This allows the operator to further tailor the types of information content that may be made available to each mobile platform accessing the system in a manner that allows the operator to manage the overall cost incurred in supplying the information.

In still another preferred embodiment, the graphical user interface allows the operator to designate different types of information content that may be made available to its associated mobile platforms operating in different satellite coverage regions, as well as other criteria to further tailor the delivery of information content to mobile platforms operating in different coverage regions. In this embodiment the graphical user interface also provides information informing the operator which mobile platforms are operating in which geographic coverage regions, and further allows the operator to place restrictions on the delivery of specific types of content in accordance with a given geographic coverage region. Thus, information content may be made available to some mobile platforms operating in a first geographic coverage region, while that same information content may be restricted from mobile platforms operating in a different geographic coverage region.

In still another preferred form, passengers on the mobile platform can access the graphical user interface of the system either from their homes, via a wide area network, or even from the mobile platform after boarding. The passengers can use the graphical user interface to select specific types of information content to be made available to them after boarding, as well as to select seat assignments, meal options and other helpful items.

The present system and method thus more effectively allows various types of information content such as web pages, news articles, video files, software or any other form of information content available in electronic form, to be coordinated and aggregated more efficiently before the content is transmitted to mobile users in one or more distinct satellite coverage regions, or even to mobile platforms traversing more than one satellite coverage region. This enables information content to be more efficiently packaged before the information content is provided to the delivery mechanism and from there to the satellite transponder, or transponders, operating within one or more coverage regions.

The features, functions, and advantages can be achieved independently in various embodiments of the present system or may be combined in yet other embodiments.

BRIEF DESCRIPTION OF THE DRAWINGS

The present system and method will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
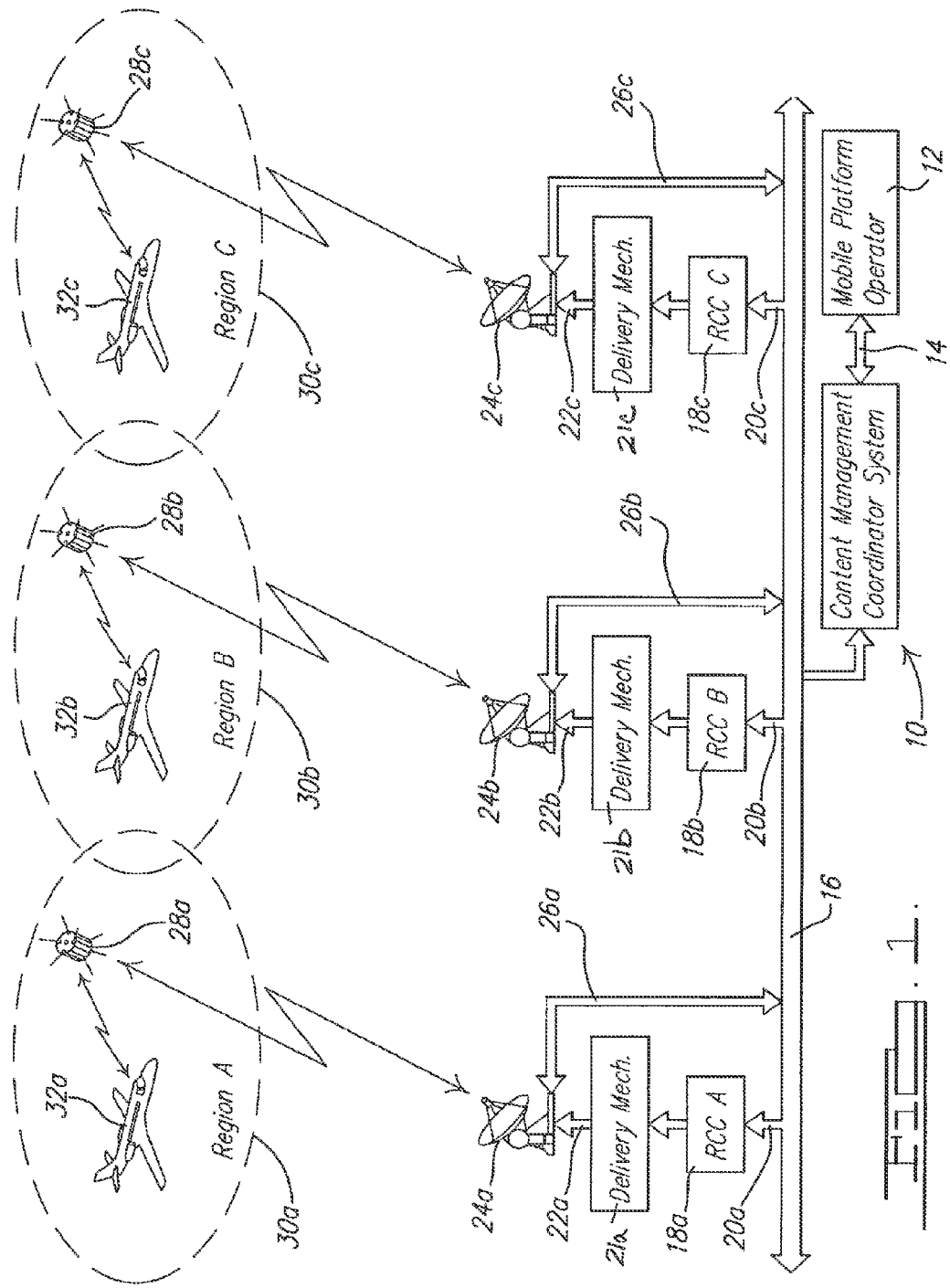
FIG. 1 is a simplified representation of a plurality of mobile platforms operating within a plurality of geographic satellite coverage regions, and wherein each of the satellites include a transponder which is in communication with a content management and coordinator system of the present system via a delivery mechanism.

Referring to FIG. 1, there is shown a content management coordinator system 10. The system 10 is in bidirectional communication with a mobile platform operator 12, via a wide area network connection 14. The mobile platform operator may be a commercial airline or any other entity having control over one or more mobile platforms that are interfacing with the system 10. The wide area network connection 14 may be an Internet connection or any other form of connection allowing bidirectional communications between the mobile platform operator 12 and the system 10.

The system 10 is further interfaced via a wide area network 16 with a plurality of regional information content centers 18a, 18b and 18c. Regional content centers could alternatively be sea-based or space-based centers. Network 16 may also comprise the Internet. Each of the information content centers 18 are interfaced with the network 16 via bidirectional network connections 20a, 20b and 20c respectively. Each regional information content center 18 provides selected information content to an associated delivery mechanism 21a, 21b and 21c, which in turn delivers the content via a network connection 22a, 22b and 22c, Network connections 22a, 22b and 22c supply the content to a corresponding terrestrial base station 24a, 24b and 24c, respectively. Each base station 24a, 24b and 24c is further in bidirectional communications with the system 10 via an associated network connection 26a, 26b and 26c, respectively. Each base station is also in bidirectional communication with a transponded satellite 28a, 28b and 28c, respectively. Base stations 24 could also be space-based.

Each of the transponded satellites 28a, 28b and 28c are associated with a given coverage region 30a, 30b and 30c. Within each coverage region 30 is shown a single mobile platform 32a, 32b and 32c, respectively, however, it will be appreciated that each region may have more than one mobile platform operating therein or alternatively may have no mobile platforms operating therein. Furthermore, it will be appreciated that while the mobile platforms 32 are illustrated only for exemplary purposes as commercial aircraft, that the present system 10 is applicable for use with any type of mobile platform such as ships, trains, busses, trucks, or other motor vehicles. Merely for convenience, the mobile platforms 32, for the purpose of discussion only, will be referred to as "aircraft" 32.

Referring further to FIG. 1, in general operation, the mobile platform operator 12 interfaces with the content management coordinator system 10 to select various types of information content that are to be made available to the aircraft 32 operating within each of the coverage regions 30. The mobile platform operator 12 also is able to place restrictions on the various types of information content that can be supplied to each of the aircraft 32 operating within the various coverage regions 30a, 30b and 30c. Each aircraft 32 further includes an onboard transmitting system and file server (not shown) for storing information content received from the base station 24 associated with its given coverage region 30. One exemplary type of onboard system which may be used by the aircraft 32 is described in U.S. application Ser. No. 10/008,401, mentioned previously herein, and hereby incorporated by reference into the present application. Each aircraft 32 can request various types of information content from its associated content center 18. The content will be delivered if the content has been authorized by the system 10 and, if so, in accordance with various criteria established by the mobile platform operator 12.

Figure 2:
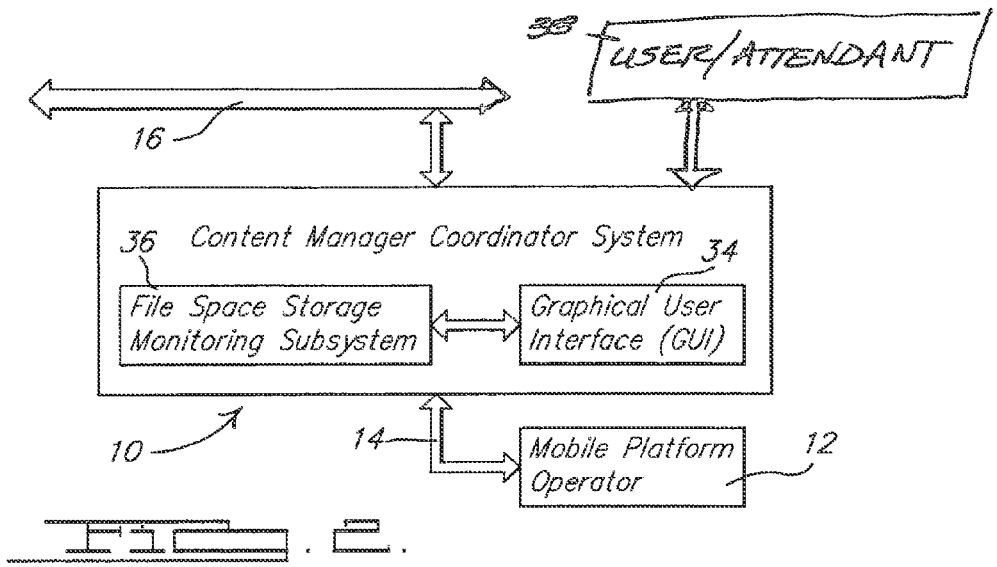
FIG. 2 is a block diagram of one preferred form of the present system interfacing with a well known delivery mechanism, with a mobile platform, and with a ground based operator of the mobile platform.

Referring now to FIG. 2, a block diagram of one preferred embodiment of the content management coordinator system 10 is illustrated. The system 10 includes a graphical user interface (GUI) 34 and a file space storage monitoring subsystem 36. The system 10 is in communication via the wide area network connection 14 with the mobile platform operator 12. Again, while a single mobile platform operator 12 has been illustrated, it will be appreciated that in practice a plurality of mobile platform operators 12 may be in communication with the system 10 via one or more network connections.

The graphical user interface 34 provides the mobile platform operator 12 with a number of selections or options for tailoring the availability of information content to its associated aircraft 32 operating within the various coverage regions 30*a*, 30*b* and 30*c*. In particular, the graphical user interface 34 provides the following exemplary selections:

specific type of information content allowed;

restrictions on specific types of information content for each coverage region 30;

specific time frame (or time frames) during which specific types of information content are to be made accessible by each aircraft 32;

assigning a priority level making the delivery of one or more types of information content mandatory to each aircraft 32 as soon as the aircraft enters one or more specified coverage regions;

making a best effort to deliver one or more types of information content, upon request by a given aircraft 32, to one or more specified coverage regions 30;

giving no priority to requested information content being requested by an aircraft in one or more specified coverage regions;

giving certain types of information content priority over other types of information content;

specifying whether one or more specific types of information content are to be supplied at regular, predetermined time intervals automatically to each aircraft 32 operating within a given coverage region 30; and providing the mobile platform operator 12 with the ability to select different types of information content to be made available to each aircraft 32 in a specified coverage region 30 based on the cost of providing the given information content to the operator 12.

It will be appreciated that the above options made available to the mobile platform operator 12 are merely meant for exemplary purposes, and that other various forms of selections or criteria may easily be implemented through the system 10 to further allow the operator 12 to tailor the information content made available to each aircraft 32. The criteria established by the operator 12 allows content such as web pages, news articles, advertisements, streaming video files, software, email access, etc. to be coordinated and aggregated by the system 10 to most efficiently use the limited resources available from each satellite transponder 28 in each coverage region 30.

In additional specific implementations, the system 10 can be used to coordinate and aggregate the delivery of specific advertising materials to an operator's website so that the advertisements can be uploaded to the aircraft 32 traveling within one or more specific coverage regions at specific times of day, such as at peak times where a maximum number of aircraft are expected to be operating within the coverage region(s). This feature could potentially enhance revenue generation for the operator 12 operating the aircraft 32 by maximizing the possibility that the advertising materials would be viewed by the greatest number of passengers.

Another implementation would be to use the system 10 to deliver flight information, rental car information, or any other penitent information to travelers at specific times of day or for specific time periods throughout the day. Still another implementation would be to use the system 10 to schedule the delivery based on highest demand times for entertainment materials, streaming video of news, sporting events, televisions shows, or other financial information with or without additional advertising materials, that could be offered for a fee or for no fee to passengers on the aircraft.

Through all of the above exemplary implementations, a key aspect is that the information content or advertising content is packaged, aggregated and delivered to passengers on the aircraft 32 in a logical and efficient manner that most efficiently uses the limited transponder bandwidth available for serving a given coverage region.

The file storage monitoring subsystem 36 is also preferably incorporated with the content management coordinator system 10. The monitoring subsystem 36 enables the system 10 to monitor the availability of the file storage space on the file server on each aircraft 32, and to delete previously stored information on the file server as needed so that sufficient storage space is available for newly requested information content. This further ensures that transponder bandwidth will only be used to provide information content to a given aircraft 32 when sufficient storage space is available, or made available, by the monitoring subsystem 36 for storing the newly requested information content. The monitoring subsystem 36 could further monitor the entry or departure of each mobile platform 32 within each of the coverage regions 30 to allow information content being transmitted to a given coverage region to be terminated if the aircraft 32 within that specific coverage region should leave the region. This feature also enables one or more specific types of information content 12 to be automatically transmitted to an aircraft 32 that enters a given coverage region 30, in accordance with previously selected criteria by the mobile platform operator 12.

In FIG. 2, the system 10 optionally provides for the ability of a user, for example a passenger of attendant 38, to access the system 10 and select information content remotely from his/her home or office, or possible even from the mobile platform 15. In this embodiment the user/attendant accesses the GUI 34 and is provided with various content options, as allowed by the operator 12. In this manner the user/attendant can select various forms of information content to be provided to him/her during his/her travel on the mobile platform 15. Additional information such as seat assignment information or meal request selections could also be coordinated through the system 10. The user/attendant could also be provided with rental car information or reservation options at this time.

Figure 3:
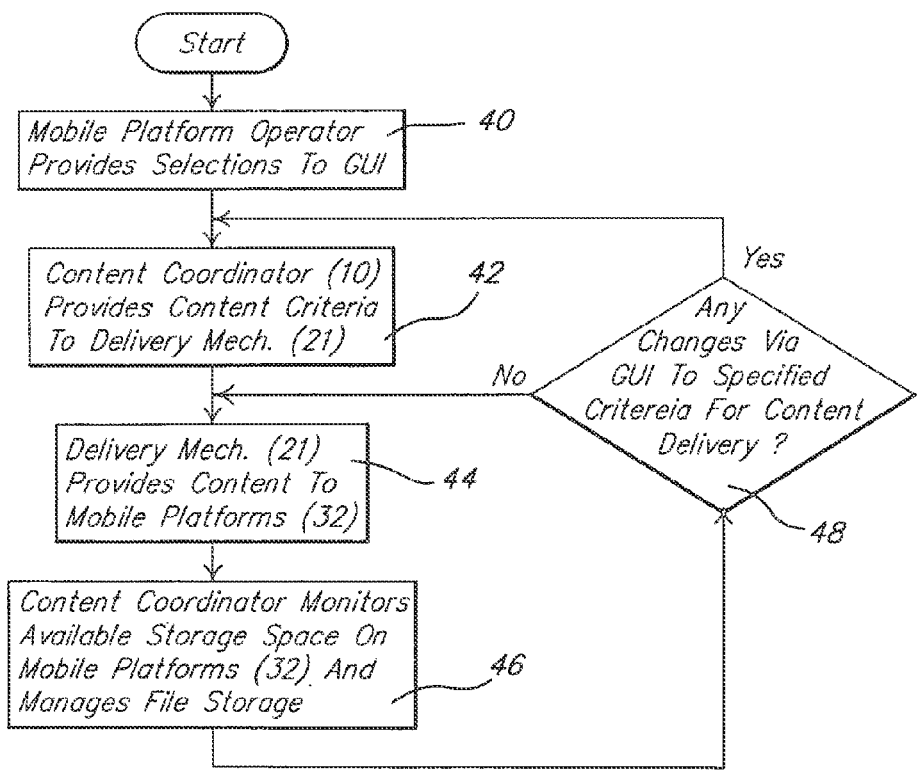
FIG. 3 is a flow chart illustrating the operations performed by one preferred embodiment of the present system.

Referring now to FIG. 3, a simplified flow chart is shown illustrating the steps of operation of the system 10. Initially, the mobile platform operator 12 interfaces with the GUI 34 of the system 10 to define criteria upon which one or more types of information content are to be made available to its associated aircraft 32 operating within each coverage region 30, as indicated at operation 40. The content coordinator 10 provides instructions to the delivery mechanism 21 associated with each regional content center 30, as indicated at operation 42. These instructions define the criteria upon which various types of information content are to be provided to the aircraft 32 operating within a given coverage region 30. In operation 44, the delivery mechanism 21 provides the content to the aircraft 32 operating within the coverage regions 30 in accordance with the criteria defined by the mobile platform operator 12. At step 46, the file space storage monitoring subsystem 36 of the system 10 monitors the available storage space on each aircraft 32 and deletes previously stored information as needed to ensure that newly requested information content from the aircraft 32 is able to be stored thereon. The system 10 then checks the GUI 34 to determine if the operator has made any changes to the criteria by which information content is to be delivered to the aircraft 32, as indicated at operation 48. If no changes have been made, then the delivery mechanism 21 continues to deliver the information content in accordance with the criteria defined by the mobile platform operator 12, as indicated at operation 44. If any changes have been made by the mobile platform operator 12, then the system 10 so instructs the delivery mechanism 10 so that subsequently requested information content is only made available to the aircraft 32 in accordance with the newly defined criteria from the mobile platform operator 12.

The system 10 thus enables a wide variety of information content to be coordinated, aggregated and delivered to various mobile platforms operating within one or more predefined geographic coverage regions in a manner which most effectively makes use of the limited bandwidth of each transponded satellite operating within each coverage region. The system 10 allows various types of information content to be defined by the mobile platform operator 12, as well as to allow the mobile platform operator to set restrictions on the delivery of various types of information content to one or more specific coverage regions 30, and further to coordinate the delivery and availability of various types of information in accordance with costs, with time of day, with the importance of a specific type of information being requested, and with other factors. The system 10 further ensures that transponder bandwidth will be used efficiently by monitoring the space available for file storage on each mobile platform and deleting old files as needed to ensure that newly requested information content can be stored by the mobile platform and made available to users thereon. In one preferred embodiment the system 10 further enables users such as passengers of attendants working on the mobile platform 32 to select various forms of information content for use before boarding the mobile platform, or even while on the mobile platform.

While various preferred embodiments have been described, those skilled in the art will recognize modifications or variations which might be made without departing from the inventive concept. The examples illustrate the system and are not intended to limit it. Therefore, the description and claims should be interpreted liberally with only such limitation as is necessary in view of the pertinent prior art.

What is claimed is:

1. A method for globally managing delivery and storage of data content on a plurality of mobile platforms using a satellite based network infrastructure, wherein the data content comprises at least one of web pages, news articles, video files, software, or other forms of content in electronic form, the method comprising:

receiving, by a terrestrial-based content management subsystem, data indicative of one or more user-selected options for managing a plurality of types of information content to be stored on a selected one of the plurality of mobile platforms, the user-selected options including at least one request for one or more of the types of information content, and wherein the user-selected options include designations as to different types of information content that are available to the selected mobile platform based on different satellite coverage regions;

determining, by the terrestrial-based content management subsystem, a current geographic location of the selected mobile platform, determining restrictions as to delivery of types of content based on the geographic location, and determining available transponder bandwidth of the satellite based network infrastructure for transmitting information content to the selected mobile platform while in the current geographic location;

based on the current geographic location, the plurality of types of information, and the one or more user-selected options:

selectively transmitting information content to the selected mobile platform using the available transponder bandwidth in the current geographic location, said selectively transmitting comprising coordinating and aggregating the transmitted information based on the available transponder bandwidth, the plurality of types of information, and the restrictions as to delivery of types of content based on the geographic location, wherein information content available to mobile platforms operating in a first geographic coverage region can be restricted from mobile platforms operating in a second geographic coverage region, wherein the first and second geographic coverage regions are different; and remotely monitoring, by the terrestrial-based content management subsystem using the user-selected options, storage of the information content on the selected mobile platform based on information content to be transmitted to the selected mobile platform; and determining an updated geographic location of the selected mobile platform and, based on the updated geographic location, performing said determining available transponder bandwidth, selectively transmitting information content, and remotely managing to account for the updated geographic location.

2. The method of claim 1, further comprising causing rendering of a graphical user interface operable to facilitate selection of the one or more user-selected options for managing information content.

3. The method of claim 1, wherein the information content is selectively transmitted to the selected mobile platform using a delivery mechanism selected to efficiently utilize the available transponder bandwidth.

4. The method of claim 1, wherein the remotely monitoring storage comprises modifying data stored on the selected mobile platform.

5. The method of claim 1, wherein the remotely monitoring storage comprises monitoring storage capacity on the selected mobile platform and making a determination that available storage capacity on the selected mobile platform is inadequate for requested information content.

6. The method of claim 1, wherein the selectively transmitting further comprises selectively transmitting the information content to the selected mobile platform based on a current time of day, wherein the received user-selected options include options for content delivery based on the current time of day.

7. The method of claim 1, wherein the selected mobile platform comprises an aircraft.

8. The method of claim 1, further comprising establishing a communication session between the selected mobile platform and the terrestrial-based content management subsystem using the satellite based network infrastructure.

9. The method of claim 1, wherein the satellite coverage region is predetermined.

10. A system for global delivery and storage of data content on a mobile platform using a satellite based network infrastructure, wherein the data content comprises at least one of web pages, news articles, video files, software, or other forms of content in electronic form, the system comprising a display device and at least one computing device configured to:

cause rendering of a graphical user interface on said display device, the graphical user interface operable to facilitate selection of one or more user-selected options for managing a plurality of types of information content to be received by the mobile platform, the one or more user-selected options including at least one request for one or more of the types of information content and wherein the user-selected options include designations as to different types of information content that are available to the selected mobile platform based on different satellite coverage regions;

receive data indicative of the one or more user-selected options and cause transmission of the options to a terrestrial-based content management system via the satellite based network infrastructure;

receive and store information content from the terrestrial-based content management system, the information content selected by the terrestrial-based content management system in accordance with the one or more user-selected options, the one or more user-selected options comprising at least the plurality of types of information, a current geographic location of the mobile platform, and available transponder bandwidth of the satellite based network infrastructure, wherein the information content is received while the mobile platform is in the current geographic location, and wherein said information content is aggregated by the terrestrial-based content management system based on the available transponder bandwidth, the plurality of types of information, and the restrictions as to delivery of types of content based on the geographic location, wherein information content available to mobile platforms operating in a first geographic coverage region can be restricted from mobile platforms operating in a second geographic coverage region, wherein the first and second geographic coverage regions are different; and receive and store additional information content from the terrestrial-based content management system, wherein the additional information content is received based on an updated geographic location of the mobile platform.

11. The system of claim 10, wherein the at least one computing device is further configured to allow remote management, by the terrestrial-based content management system, of storage of the information content on the mobile platform.

12. The system of claim 10, wherein the one or more user-selected options comprises a type of information content to be received by said mobile platform.

13. The system of claim 10, wherein the one or more user-selected options comprises a priority for delivery of the information content to the mobile platform.

14. The system of claim 10, wherein the one or more user-selected options comprises a time frame during which the information content is to be transmitted to the mobile platform.

15. The system of claim 11, wherein the remote management includes allowing the content management system to monitor available storage capacity on the mobile platform and selectively delete data stored on the mobile platform.

16. The system of claim 15, wherein the one or more user-selected options comprises an option to automatically receive selected information content when the mobile platform enters a predefined geographic region.

17. A system for globally managing delivery and storage of data content on a plurality of mobile platforms using a satellite based network infrastructure, wherein the data content comprises at least one of web pages, news articles, video files, software, or other forms of content in electronic form, the system comprising at least one computing device configured to:

receive data indicative of one or more user-selected options for managing a plurality of types of information content to be stored on a selected one of the plurality of mobile platforms, the one or more user-selected options including at least one request for one or more of the types of information content, and wherein the user-selected options include designations as to different types of information content that are available to the selected mobile platform based on different satellite coverage regions;

determine a current geographic location of the selected mobile platform, determine restrictions as to delivery of types of content based on the geographic location, and determine available transponder bandwidth of the satellite based network infrastructure for transmitting information content to the selected mobile platform while the mobile platform is in the current geographic location;

based on the current geographic location, the plurality of types of information, and the one or more user-selected options:

selectively transmit information content to the selected mobile platform using the available transponder bandwidth, said selectively transmit comprising coordinating and aggregating the transmitted information based on the available transponder bandwidth, the plurality of types of information, and the restrictions as to delivery of types of content based on the geographic location, wherein information content available to mobile platforms operating in a first geographic coverage region can be restricted from mobile platforms operating in a second geographic coverage region, wherein the first and second geographic coverage regions are different; and remotely monitor, using the user-selected options, storage of the information content on the selected mobile platform based on information content to be transmitted to the selected mobile platform; and determine an updated geographic location of the selected mobile platform and, based on the updated geographic location, determining the available transponder bandwidth, selectively transmit the information content, and remotely manage the storage.

\* \* \* \* \*